May 25, 1937.  H. W. PLEISTER  2,081,764
BOLT ANCHOR
Filed July 31, 1935   2 Sheets-Sheet 2
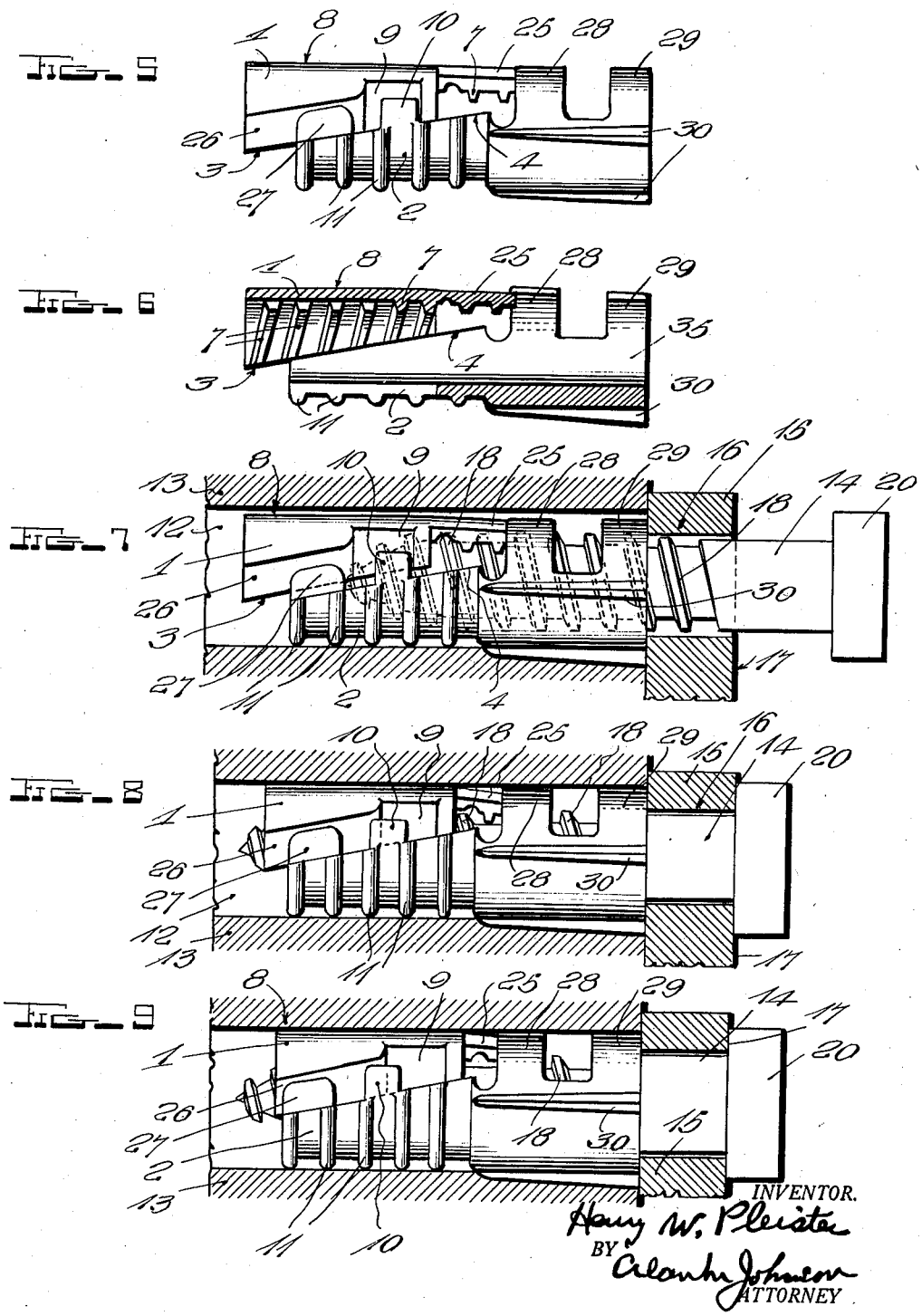

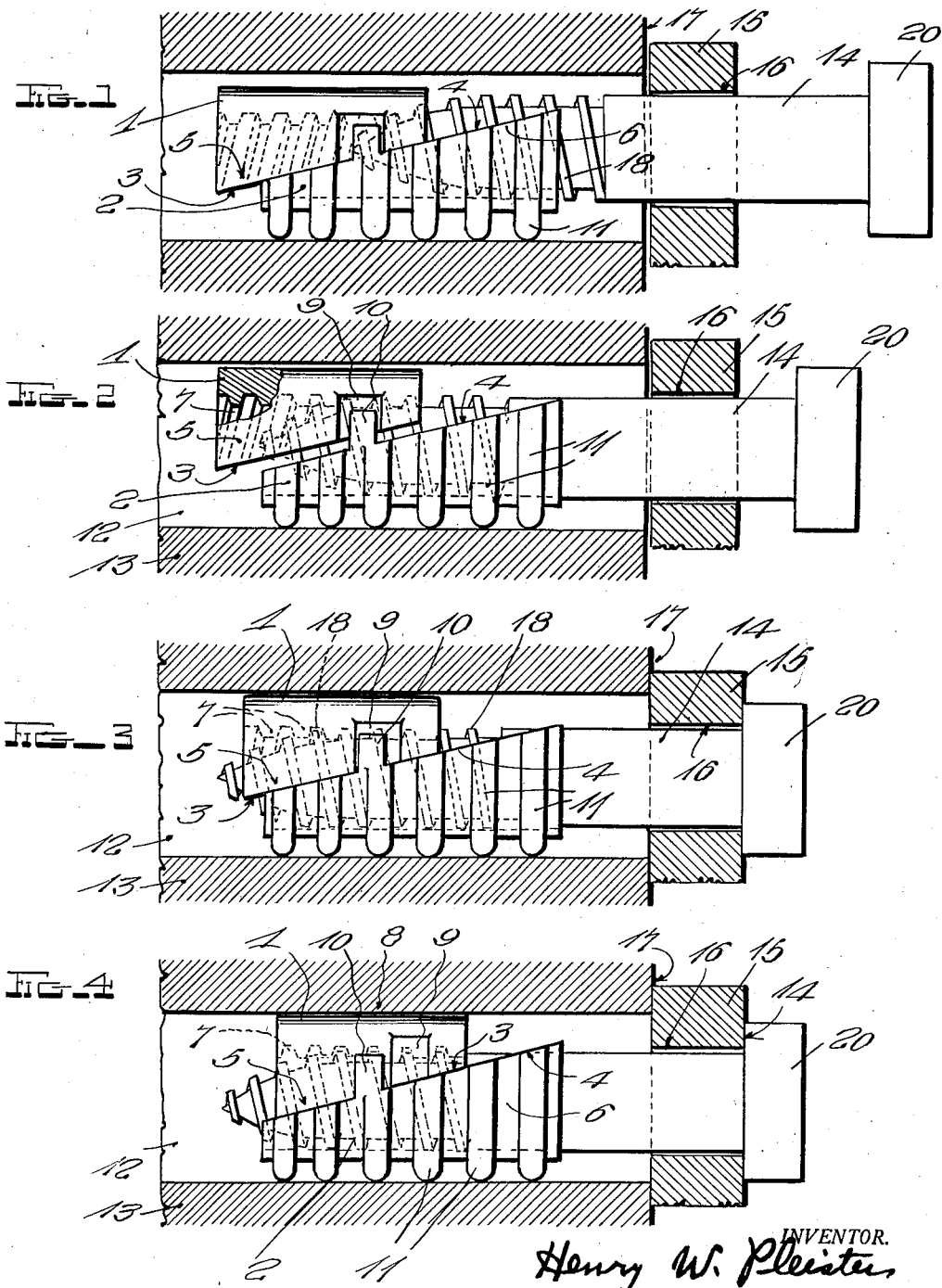

Patented May 25, 1937

2,081,764

UNITED STATES PATENT OFFICE 2,081,764

BOLT ANCHOR

Henry W. Pleister, Westfield, N. J., assignor to H. B. Newhall Corporation, Garwood, N. J., a corporation of New Jersey Application July 31, 1935, Serial No. 34,104

1 Claim. (Cl. 85—2.4)

My invention relates to bolt anchors.

My invention comprises a bolt anchor having a shield formed of a plurality of parts, preferably, though not necessarily, two in which a relatively quick initial radial expansion is first imparted to one of the shield members to approximately and roughly seat the shield in the hole, in a wall or other support, and then, subsequently, to increase the bond or grip of the shield by causing the moving shield member to move longitudinally and radially for the final and permanent bond with the wall of the hole.

My invention further comprises a bolt anchor in which the area of contact between the expanding and expansible members is not materially reduced by the operation of the expanding means.

When one of the shield members is provided with a mutilated interior female thread, as is the form which I have shown by way of illustration, and has reached its maximum expansion in the hole, the area of contact between the female threads, and the male threads of an expanding lag screw, bolt or other member, in my invention, is not materially reduced, so that when an excessive load is thrown on the article or work supported, there is little or no danger of the screw threads stripping, and letting the work fall, to the possible danger of employes and to the work.

My invention also permits a quick application of the work to the support, thereby permitting a saving in the cost of labor.

My invention further relates to certan combinations, sub-combinations, articles of manufacture and details of construction, all of which will be more fully hereinafter described and pointed out in the claim.

In the figures I have shown different embodiments of my invention, the same reference numerals refer to similar parts in the several figures.

In Figs. 1 to 4 I have illustrated one form of my invention. Fig. 1 is a longitudinal section through a wall of brick, concrete, masonry, terra cotta, stone or similar material showing an expanding bolt just entering the axial bore of the shield. The two inclined or wedge surfaces 3 and 4 have not yet been separated by the bolt.

Fig. 2 is a view similar to Fig. 1, showing the bolt or screw, screwed into the shield a sufficient distance to obtain the quick initial radial expansion, the two inclined wedge surfaces 3 and 4 being separated.

Fig. 3 is a view similar to Fig. 2, with the bolt or screw, screwed into the shield until the head of the bolt engages with the work, when further rotation of the bolt causes the shield member 1 to move to the right to again bring the two inclined wedge surfaces 3 and 4 together.

Fig. 4 is a view similar to Fig. 3, showing the shield members 1 and 2 after the screw or bolt has been screwed home.

In Figs. 5 to 9 inclusive, I have shown another form of my invention. Fig. 5 is a side elevation.

Fig. 6 is a longitudinal vertical section.

Fig. 7 is a side elevation of this form of my bolt anchor, the wall or other support and the work supported being shown in section. In this figure the bolt has just been inserted a sufficient distance to cause the quick radial expansion by separating the inclined or wedge surfaces 3—3 and 4—4.

Fig. 8 is a side elevation, similar to Figure 7, showing the position of parts when the head of the bolt is brought up against the work, and the inclined or wedge surfaces 3—3 and 4—4 are again brought into contact, just prior to their final longitudinal radial movement.

Fig. 9 is a view similar to Figure 8, with the bolt anchor completely expanded, after the initial radial expansion, and the final longitudinal radial expansion.

My bolt anchor is ordinarily meant to be used in holes drilled, or otherwise formed in masonry, brick, terra cotta, concrete or similar hard material.

Often the work supported or held by the bolt anchor is quite heavy. Frequently, excessive loads, not originally planned for, are thrown on one or more of the bolt anchors. For example, bolt anchors supporting a heavy cable, or other heavy work, may suddenly have an additional and excessive load thrown upon them by some accident, or other cause. When a plurality of bolt anchors are employed and one of them gives way under such circumstances, its share of the load is thrown on the adjacent bolt anchors, which may not hold, so that a whole installation of cable, pipe, or other heavy work, may fall with possible injury to employes, or damage to the work supported, or both.

One of the causes of failures in bolt anchors employing screw threads is that an excessive and unexpected load will often strip the threads and permit the work to fall. This is due to the fact that in the ordinary bolt anchor the further female screw threaded expansible members are forced apart by the male threads of the expanding screw, the area of contact between the male and female threads becomes less and less. This permits a more ready stripping of the screw threads, and leads to the failure of the bolt anchor, often with disastrous results.

By my invention the expansion of the bolt anchor is accomplished without substantially reducing the area of contact between the male and female threads, thereby insuring the maximum grip or bond between these threads and adding greatly to the safety of the fastening.

By my invention the time of application is also reduced to the minimum, thereby saving on the cost of installation.

This is due to the fact that the quick initial radial expansion roughly seats the bolt anchor in the hole in the support, so that only a relatively small additional turning of the head of the bolt is necessary to complete the installation with the maximum grip or bond between the male and female threads, and between the bolt anchor and the wall of the hole.

In the simplest form of my invention, that shown by way of example in Figs. 1 to 4 inclusive, the shield consists of the two members 1 and 2, the member 1 having an open side 5 and inclined or wedge surfaces 3—3; the member 2 has an open side 6 and inclined or wedge surfaces 4—4. The inclined or wedge surfaces 3—3 and 4—4 cooperate with each other to obtain the final longitudinal and radial expansion as will be later pointed out.

The shield member 1 is provided with interior mutilated screw threads 7—7, an exterior relatively smooth surface 8, and with shallow holding grooves 9—9 for the reception of the holding lugs 10—10 on the shield member 2. These shallow grooves 9—9 and lugs 10—10 serve to hold the two shield members 1 and 2 together for handling, shipping and transportation as shown in Figures 1 and 5.

The shield member 2 is unthreaded. Its exterior is preferably roughened by transverse ribs 11—11, adapted to bite into the surface of the hole 12 in the wall or other support 13, and resist longitudinal movement of the shield member 2 in the hole.

When the two shield members 1 and 2 are brought face to face as in Figs. 1, 5 and 6, they form a shield having an axial bore 35 which is partly provided with mutilated female screw threads, and is partly unthreaded.

The shield members 1 and 2 are so formed that the diameter of the axial bore 35 is restricted, being somewhat less than the diameter of the bolt, screw, or other expanding member 14 to be used with it.

In use the shield, comprising the members 1 and 2, held face to face by the lugs 10—10 engaging in the grooves 9—9, as shown in Figs. 1 and 5, is inserted in the hole 12 in the support 13 of masonry or other material. The bolt 14 is then passed through a hole 16 in the work 15 to be supported against the face 17 of the support 13, and into engagement with the mutilated screw threads 7—7 in the shield member 1. This is the position illustrated in Fig. 1.

On further rotation of the bolt 14, its male threads 18 cooperate with the mutilated threads 7—7 in the shield member 1. Due to the fact that the diameter of the axial bore 35 of the shield members 1 and 2 is restricted and is less than the diameter of the bolt 14, upon screwing the bolt into the shield members 1 and 2, the inclined wedge surfaces 3—3 and 4—4 are separated as the shield members 1 and 2 are caused initially to move radially with relation to each other. The holding lugs 10—10 yield slightly to permit this initial radial expansion. The parts are now in the position illustrated in Figs. 2 and 7, the shield members 1 and 2 having quickly and roughly adjusted themselves to the wall of the hole 12. For purposes of clearer illustration, in Figs. 2 and 7, the shield member 1 is shown not quite touching the surface of the hole.

Upon further rotating the bolt 14, its head 20 is brought up against the work 15. This will cause the shield member 1 to move longitudinally to the right until its inclined wedge surfaces 3—3 again contact with the cooperating inclined wedge surfaces 4—4 on the relatively non-movable shield member 2, see Fig. 3. This longitudinal movement, to cause the inclined or wedge surfaces to again contact with each other, is more or less free, there being no wedge action of the inclined surfaces 3—3 and 4—4. The exterior of the shield member 1 being relatively smooth permits this movement.

The parts are now in position for the final wedging and radial movement which sets the bolt anchor. Upon further rotation of the bolt 14, the inclined or wedge surfaces 3—3 on the member 1 are caused to ride up or wedge on the cooperating inclined or wedge surfaces 4, 4 on the shield member 2, the holding lugs 10—10 usually slipping out of the shallow holding grooves 9—9, the side of the grooves being inclined to permit this action.

This gives the final expansion, which is both longitudinal and radial, the parts then being as illustrated in Figs. 4 and 9.

My bolt anchor permits a quick application, with a minimum amount of time, and insures a maximum grip or bond between the bolt anchor and the surface of the hole in which it is mounted.

In Figs. 5 to 9 inclusive, I have illustrated another form of my invention in which in addition to the features previously described, I provide the member 1 with a tongue 25 and with cut-away portions 26—26, to form a portion of a ship lap.

The shield member 2, in addition to the features above described, is provided with the complementary portions 27—27 of the ship lap, and with guide lugs 28—28 to cooperate and guide the tongue 25. The ends of the tongue may be pressed down firmly against the male threads of the bolt, at the extreme expansion, to form a lock, see Figs. 8 and 9.

The shield member 2 is also provided with the head lugs 29—29, to form a head for the bolt anchor. It may also be provided with longitudinally extending holding ribs 30—30, to engage with the walls of the hole and prevent rotation of the member 2.

These features, a ship lap, locking tongue, guide lugs, and head lugs, are similar to those illustrated and described in U. S. Patent 2,004,480 granted June 11, 1935, to me and John Karitzky as joint inventors. No claim is made for these features in this application.

The axial bore 35 in both forms of my invention illustrated is preferably though not necessarily non-tapering, so that parallel expansion may be obtained. In some cases I may taper the axial bore.

In both forms, illustrated by way of example, the maximum and final expansion is obtained without substantially reducing the area of contact between the female threads 7 and the male threads 18. On the first and original radial expansion, when the bolt is first screwed into the shield members, Figs. 2 and 7, there is full contact between the female threads 7 and male threads 18. This full contact between the male and female threads continues until the very final radial expansion shown in Fig. 4 and Fig. 9. Most all the radial expansion having been exerted prior to the final combined longitudinal and radial expansion, Fig. 4 and Fig. 9, any withdrawal of the female threads 7—7 from the male threads 18—18 will be practically nil, so that, in my invention there is practically no reduction of contact area between the male and female threads. This insures permanence of the fastening because the threads will not be stripped, due to any accidental and excessive load placed upon it.

The mode of operation of my bolt anchor, illustrated in Figs. 5 to 9, is the same as that fully described in Figs. 1 to 4 inclusive.

Having thus described this invention in connection with different illustrative embodiments thereof, to the details of which I do not desire to be limited, which is claimed as new and what is desired to secure by Letters Patent is set forth in the appended claim.

What I claim is:

In a bolt anchor to cooperate with a given size bolt or screw, said anchor being provided with a throat having a diameter to receive said given size bolt, the combination of a shield, formed of a plurality of radially movable parts, at least one of which parts, is provided with interior mutilated female threads, said shield having an axial bore of less diameter than the diameter of a given size bolt or screw, an expanding bolt or screw adapted to pass freely thru the throat of the bolt anchor, but being of greater diameter than the axial bore of the bolt anchor, thereby insuring a quick preliminary or rough radial expansion of the bolt anchor, and that the area of contact between the male thread of the expanding bolt or screw and the mutilated female thread of the shield will not be substantially decreased as the shield is expanded by the bolt or screw, preventing stripping of the mutilated screw threads, and means including wedge surfaces to give the final radial expansion to the bolt anchor.

HENRY W. PLEISTER.